United States Patent [19]

Kunz

[11] 4,058,634
[45] Nov. 15, 1977

[54] METHOD FOR DRYING AGRICULTURAL FEED MATERIALS, PULP-LIKE MATERIALS

[75] Inventor: Werner Kunz, Lenzburg, Switzerland

[73] Assignee: W. Kunz AG, Dintikon, Switzerland

[21] Appl. No.: 672,060

[22] Filed: Mar. 31, 1976

[30] Foreign Application Priority Data

Apr. 1, 1975 Switzerland ............... 4094/75

[51] Int. Cl.² .................... A23N 1/00; A23L 1/20
[52] U.S. Cl. ............................ 426/456; 34/9; 34/14; 34/17; 426/489; 426/506; 426/465
[58] Field of Search ............... 426/455, 456, 465, 473, 426/489, 495, 506, 519, 807; 432/106; 34/9, 12, 14, 11, 17, 19, 60, 70, 135

[56] References Cited

U.S. PATENT DOCUMENTS

| 1,007,622 | 10/1911 | Wurl | 426/465 X |
| 1,096,854 | 5/1914 | Morley | 34/14 X |
| 1,204,845 | 11/1916 | Bruhe | 34/14 X |
| 1,946,814 | 2/1934 | Sims | 426/455 |
| 2,236,006 | 3/1941 | Mulvany | 426/473 |
| 2,534,640 | 12/1950 | Valeh | 426/465 X |
| 2,877,122 | 3/1959 | Hiller | 426/465 |
| 3,738,796 | 6/1973 | Arnold | 432/106 |
| Re. 7,618 | 4/1877 | Fuller | 34/12 |

Primary Examiner—S. Leon Bashore
Assistant Examiner—Kenneth M. Schor
Attorney, Agent, or Firm—Ernest F. Marmorek

[57] ABSTRACT

The drying method according to the invention provides first for the moistening of the material with juice pressed out from the material of an earlier run and the material is passed through a heat exchanger the heat of which is derived solely from the exhaust air of the main drying unit and subsequently pressing out the excessive moisture from the material before the main dryer.

3 Claims, 4 Drawing Figures

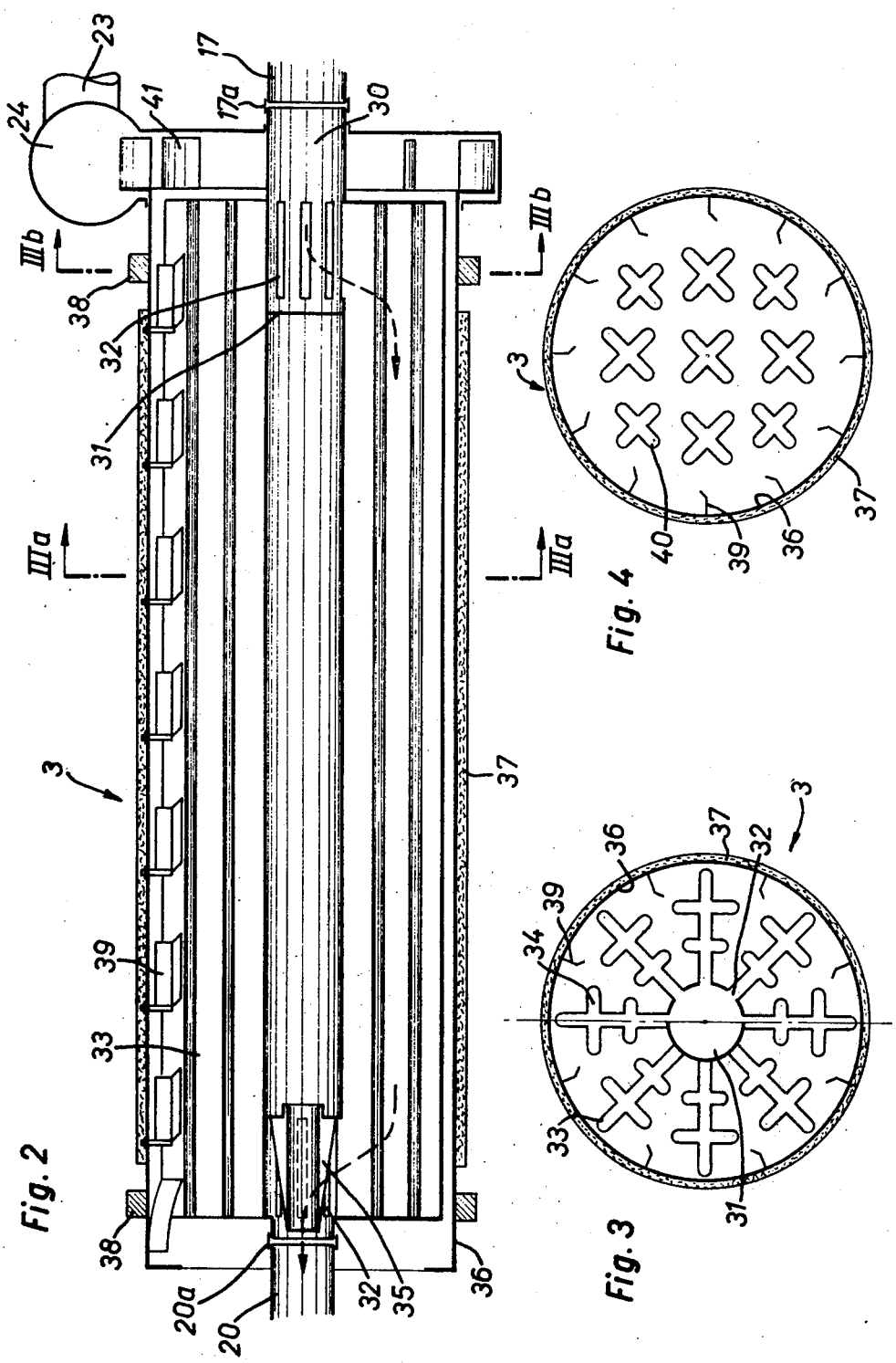

METHOD FOR DRYING AGRICULTURAL FEED MATERIALS, PULP-LIKE MATERIALS

FIELD OF THE INVENTION

The present invention relates to a method for the drying of agricultural feed materials and pulp-like materials in a drying apparatus in which it undergoes a predrying step before it is fed into a drying device having an oven associated with it.

BACKGROUND OF THE INVENTION

It has been known to dry agricultural feed materials like grass, lucerne, sugar beet slices, potatoes and other products, in order to preserve them, by using drying apparatus, especially drum-type drying apparatus. In such apparatus the drying air exits into the atmosphere saturated more or less with steam and at a temperature between about 100° through 150° C. There have been numerous prior attempts to make use of the exhaust air existing into the atmosphere and in order to reduce thereby the energy use of the drying apparatus. Such attempts ran aground so far on the high additional costs of the apparatus involved. Similar problems are involved also when pulp-like materials are being dried.

SUMMARY OF THE INVENTION

It is, therefore, an object of the present invention to provide a drying method for the above-mentioned agricultural feed materials in which the energy used for the drying is substantially reduced at a minimal additional cost of the devices and apparatus which are used.

Accordingly, the invention provides that the material to be dried is supplied into a heat exchanger heated with the exhaust air of the drying apparatus and, before it is supplied into the heat exchanger, it is wetted with a juice which, after it passes through the heat exchanger, becomes pressed out from the material.

According to the present invention the overall drying apparatus for performing the method according to the present invention is provided with a drying drum which is the main dryer itself and prior to the drying drum a predrying drum is provided as a heat exchanger. The heat exchanging surfaces of the predrying drum from one side are supplied with the exhaust air of the main drying drum and from the other side are supplied with the material to be dried. Between the predrying drum and the main drying apparatus there is provided juice press.

BRIEF DESCRIPTION OF THE DRAWINGS

The invention will become more readily apparent from the following description of a preferred method thereof and a preferred embodiment therefor for practicing the method according to the present invention, such preferred embodiment being shown by way of example in the accompanying drawings, in which:

FIG. 2 is a sectional view of a schematically illustrated predrying drum according to the present invention;

FIG. 3 is a section taken perpendicularly to the axis of the predrying drum of FIG. 2 and in which the left side of FIG. 3 represents the section according to line IIIa — IIIa and the right side of the figure represents the section taken along line IIIb — IIIb; and FIG. 4 is a cross-sectional view taken across a further embodiment of the predrying drum according to the present invention.

DESCRIPTION OF THE PREFERRED METHOD AND EMBODIMENT

Figure 1:
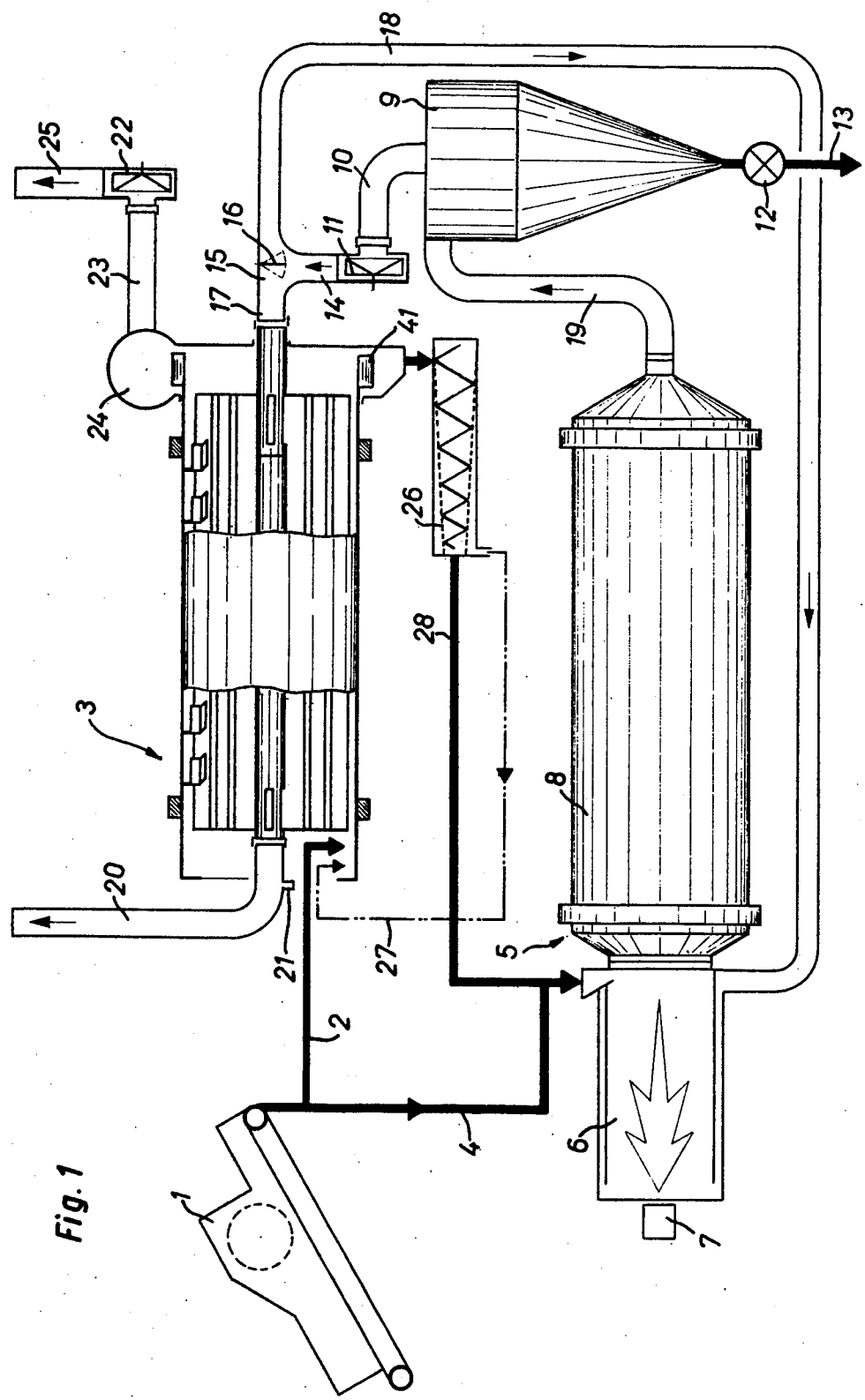
FIG. 1 is a diagrammatic illustration of a drying apparatus according to the present invention and for performing the method according to the present invention.

With reference to FIG. 1 the material to be dried is supplied to the drying apparatus by means of a feed apparatus 1 after it has been appropriately prepared, such as further chopped. By means of the supply device 1 which can be a conveyor belt of any appropriate construction, the material to be dried is raised to a predetermined height from which by means of a further transporting device 2 is supplied into the predrying drum 3 or by means of a transporting device 4 it is fed into the drying drum 5. The transporting devices 2 and 4 illustrated in FIG. 1 with the solid lines can have any appropriate construction such as screw-type or conveyor belt.

The predrying drum 3 is a rotating drum or as a stationary drum having a rotating heat exchanger surface or surfaces in it and its construction will be discussed in more detail in connection with FIGS. 2 - 4.

The drum apparatus or main drying section 5 comprises substantially an oven 6 having a heating device 7 which is not shown in detail and which can be either oil or a gas heating device. To the oven 6 a rotating drying drum 8 is coupled in which the drying air heated up in the oven 6 is entered together with the material to be dried. For an effective drying process it is essential that the material to be dried be uniformly wet and it be given into the drying drum 8 in the form of a homogeneous product.

The dried material is removed from the drying drum 8 by means of an air stream through a conduit 19 and enter a cyclone 9 in which it is separated from the air stream. The air which is more or less saturated with steam is removed through conduit 10 by means of a blower 11 while the dried material is removed from the cyclone 9 at its lower side through an air-lock 12 and is carried away for further processing as indicated by the arrow 13, such as for pressing into pellets.

To the blower 11 on its pressure side a conduit 14 is coupled which, in turn, goes into a branch portion 15 in which a flap valve 16 is placed and through which the exhaust air of the main drum 5 is supplied partially over a stub 17 into the predrying drum 3 and partially over a return conduit 18 is fed back into the oven 6 in order to obtain a possibly high steam concentration with a correspondingly high condensation point.

The exhaust air fed into the predrying drum 3 either over the stub 17 will fall on one side of the heat exchanging surfaces arranged in the drum 3, while the other side of the heat exchanging surfaces will receive the material to be dried which, as can be seen in the drawing, are supplied into the drum 3 by means of the transporting device 2 at the opposite end to the stub 17.

The exhaust air supplied into the predrying drum 3 from the drying duct 5 has a temperature of about 100° - 150° C. In the predrying drum 3 the air will give up a part of its heat onto the heat exchanging surfaces and becomes thereby condensed. The cooled exhaust air then will leave the predrying drum 3 over a conduit 20 and it exits into the atmosphere, on the other hand the condensate is removed over a condensate conduit 21. Together with the material to be dried a certain controlled quantity of fresh air is also supplied to the predrying drum which serves for the removal of the vaporized liquid and of the dried material from the drum 3. The fresh air which is supplied with the material to be dried at one side of the predrying drum 3 is removed at the opposite side of it by means of a blower 22 which at its suction side over a conduit 23 is connected with a collector 24 placed at the end of the predrying drum 3 and over a conduit 25 it exits into the atmosphere at a temperature of about 50° C.

It is essential that the material to be dried has an intimate and good contact with the heat exchanging surfaces, otherwise the advantages of the afore-described arrangement could not be utilized. By condensing the exhaust air and due to the rotation of the predrying drum 3 the heat transfer becomes good. In order to attain especially high heat transfer coefficient on the side of the material to be dried and in order to prevent the material to be predried in the drum 3 to stick to the heat exchanging surfaces, it must be wet and contain, if possible, free surface water. This is attained thereby that after it leaves the predrying drum 3 the heated material to be dried is supplied into a press 26, such as a screw-type press, in which the material becomes pressed out. The removed juice over a return conduit 27 is fed back into the predrying drum 3 and mixed with the material to be predried and entering drum 3. In addition to improving the heat transfer on the heat exchanging surfaces one will attain also that the material to be dried will not stick to the heat exchanging surfaces. After the pressing the material to be dried will have a uniform wetness or moisture distribution which is desirable for the dryig drum 8 in order to avoid a non-uniform drying. Accordingly, very efficient and desirable operational results are attained when the material given into the overall drying apparatus first by means of the transporting device 2 is supplied into the predrying drum 3 and only after the removing of the juice in the press 26 it becomes supplied by the transport device 28 into the drying apparatus 5. The transport device 4 accordingly becomes used only in exceptional cases.

According to the above described inventive method, the "predried", that is, the preheated material will leave the predrying drum 3 in a completely wet state due to the fact that a relatively large quantity of juice is fed into the predrying drum 3, whereby a complicated separation of it from the saturated air in a cyclone becomes unnecessary.

Furthermore, from the juice after the pressing, the protein can be removed and separately processed. Therefore, one obtains the fluid as a by-product of the afore-described process and which at the same time combines with the dust contained in the material to be dried thereby eliminating the necessity for another separate process.

With reference to FIGS. 2 – 4, illustrating the predrying drum 3 it is noted that similar parts as appearing in FIG. 1 will be denoted by the same reference characters and not given additional detail description hereinafter. It is seen that the very saturated exhaust air enters over the stub 17 into a center pipe 30 having a closing wall 31 and which is also provided by a number of peripherally distributed slots 32 through which the exhaust air is fed into hollow channels 33 having side channels 34. These hollow channels 33 are extending along the length of the predrying drum 3 and about the center pipe 30. The side channels 34 can have various forms and may extend entirely or partially over the length of the predrying drum 3. The removal of the exhaust air at the end of the hollow channels 33 is accomplished thereby that it enters slots 32 provided in the center pipe 30 and from there it is led into the atmosphere by a conduit 20. A guiding piece 35 built into the center pipe 30 serves for the reliable removal of the condensate.

The predrying drum 3 is provided with a rotating cylindrical-shaped sleeve 36 having insulation 37 on its outer side. The sleeve is journalled for rotation on bearings 38 shown only schematically. On the inner surface of the rotating cylindrical sleeve 36 there are provided guiding shovels 39 which aid the movement of the material to be dried through the predrying drum 3. By the closed construction of the hollow channels 33 as shown in FIG. 3, or as later described in connection with FIG. 4, one achieves that the exhaust air is completely separated from the material to be dried by the heat exchanging surfaces of the hollow channels 33. The material to be dried moves between the configurations and the plurality of the hollow channels 33 under an intensive mixing so that also on the side of the heat exchanging surfaces 33 a high heat transfer coefficient is attained and the predried goods will not stick to the outer surface of the hollow channels 33.

FIG. 4 illustrates an embodiment of the predrying drum 3 in which the hollow channels 40 are constructed as pipes having a cross-shaped cross-section. In this case both at the entry and exiting side there must be a distributing chamber present into which the exhaust air enters from the stub 17 and from which it enters the conduit 20.

A further embodiment is possible in which the cylindrical outer sleeve 36 is stationary and only the above described heat exchanging arrangement is rotating. In this case the guiding shovels 39 are fixed to the rotating part. Bearings 38 of the rotating heat exchanging arrangement in such case must be provided on the center pipe 30.

The advantage of the above described method and apparatus for performing same resides in the following:

The material to be dried such as grass lucerne or similar material, at the entry into the predrying drum 3 has an initial wetness of about 83%. Now, according to the invention, it is supplied with the juice coming from the press and the water content is increased to 90% to attain the above-described advantages. After passing the predrying drum 3 a portion becomes vaporized, such as about 40% of the water of the supplied juice so that the water content of the material falls to about 86%. From this product the juice becomes mechanically pressed out, so that the water content of the pressed material falls to about 75%. The juice is supplied to the fresh material while the pressed material is supplied into the dryer, that is, into the after-dryer 5. The material therefore enters the dryer 5 with only a water content of about 75% instead of 83% which will lead to a savings in energy of about 40%.

The vaporized water in predryer 3 will be passed along with the warm transport air into the atmosphere at about 50° C.

I wish it to be understood that I do not desire to be limited to the exact details of the method or of construction shown and described, for obvious modifications will occur to a person skilled in the art.

Having thus described the invention, what I claim as new and desire to be secured by Letters Patent, is as follows:

1. A method for drying agricultural feed material in a drying apparatus using the juice of an earlier pressing comprising the steps of:

feeding the material to the input of a predrying heat exchanger;

moistening the material prior to predrying with juice of an earlier pressed material;

passing the premoistened material through said heat exchanger heated with the exhaust aid of a main drying unit;

pressing the juice from said material after said material leaves the heat exchanger; returning the pressed juice to the input side of the heat exchanger; and feeding the predried and pressed material into a main dryer for final drying.

2. The method of drying as claimed in claim 1, wherein said exhaust air undergoes condensation in said heat exchanger and said heat exchanger comprises heat exchange surfaces and said condensate collects on the heat exchanger surfaces.

3. The method as claimed in claim 1, wherein the amount of returned juice added to said material is predetermined by the amount of said material.

* * * * *